March 31, 1942.   C. F. WEINREICH ET AL   2,278,340
APPARATUS AND PROCESS FOR FREEZING ICE CREAM
Filed Feb. 23, 1940   5 Sheets-Sheet 1
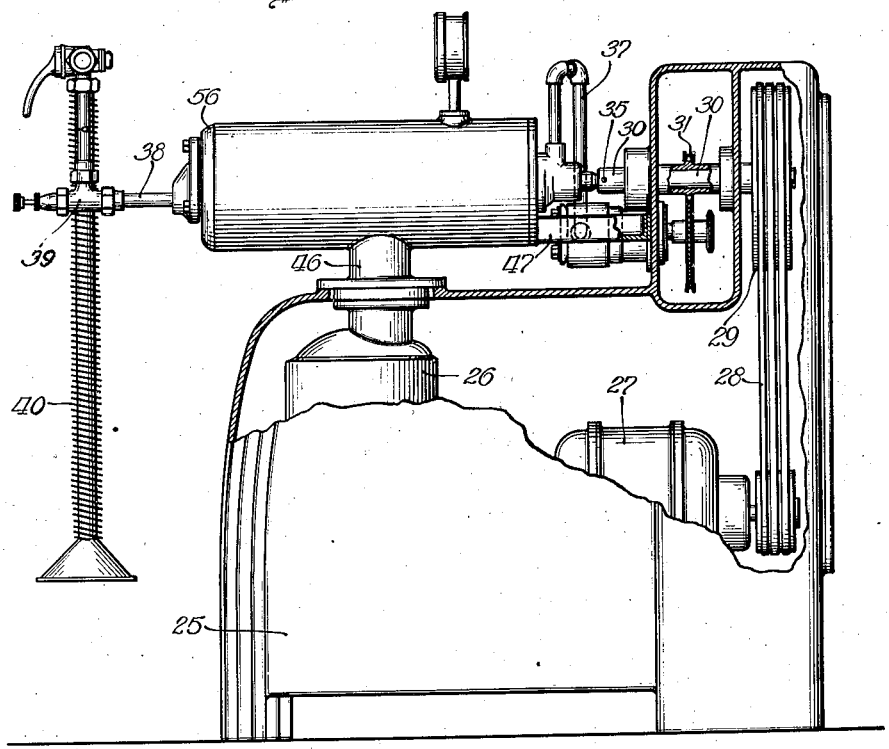
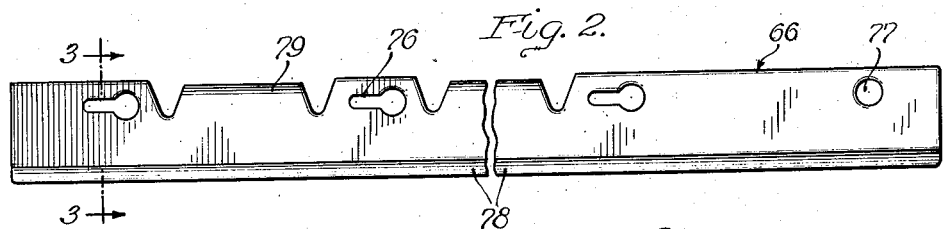
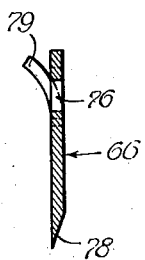
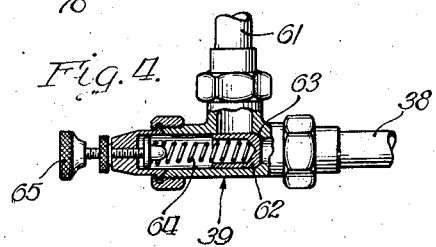
INVENTORS:
Charles F. Weinreich
Albert L. Voggenthaler
By: Norman E. H. Heletzke
ATTORNEY.

March 31, 1942.  C. F. WEINREICH ET AL  2,278,340
APPARATUS AND PROCESS FOR FREEZING ICE CREAM
Filed Feb. 23, 1940  5 Sheets-Sheet 2

INVENTORS:
Charles F. Weinreich
Albert L. Voggenthaler
By: Norman E. H. Heletzke
ATTORNEY.

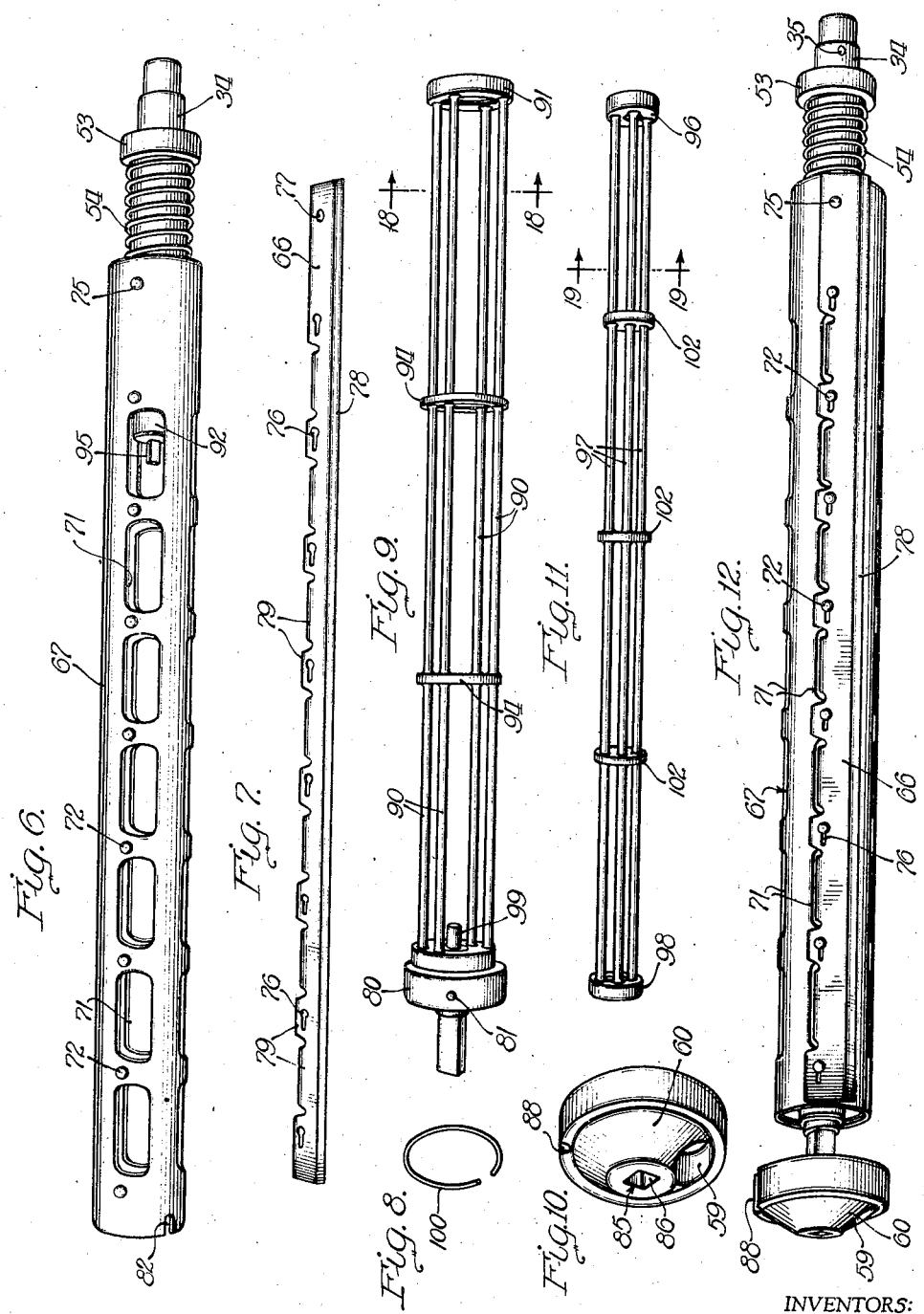

March 31, 1942.   C. F. WEINREICH ET AL   2,278,340
APPARATUS AND PROCESS FOR FREEZING ICE CREAM
Filed Feb. 23, 1940   5 Sheets-Sheet 4
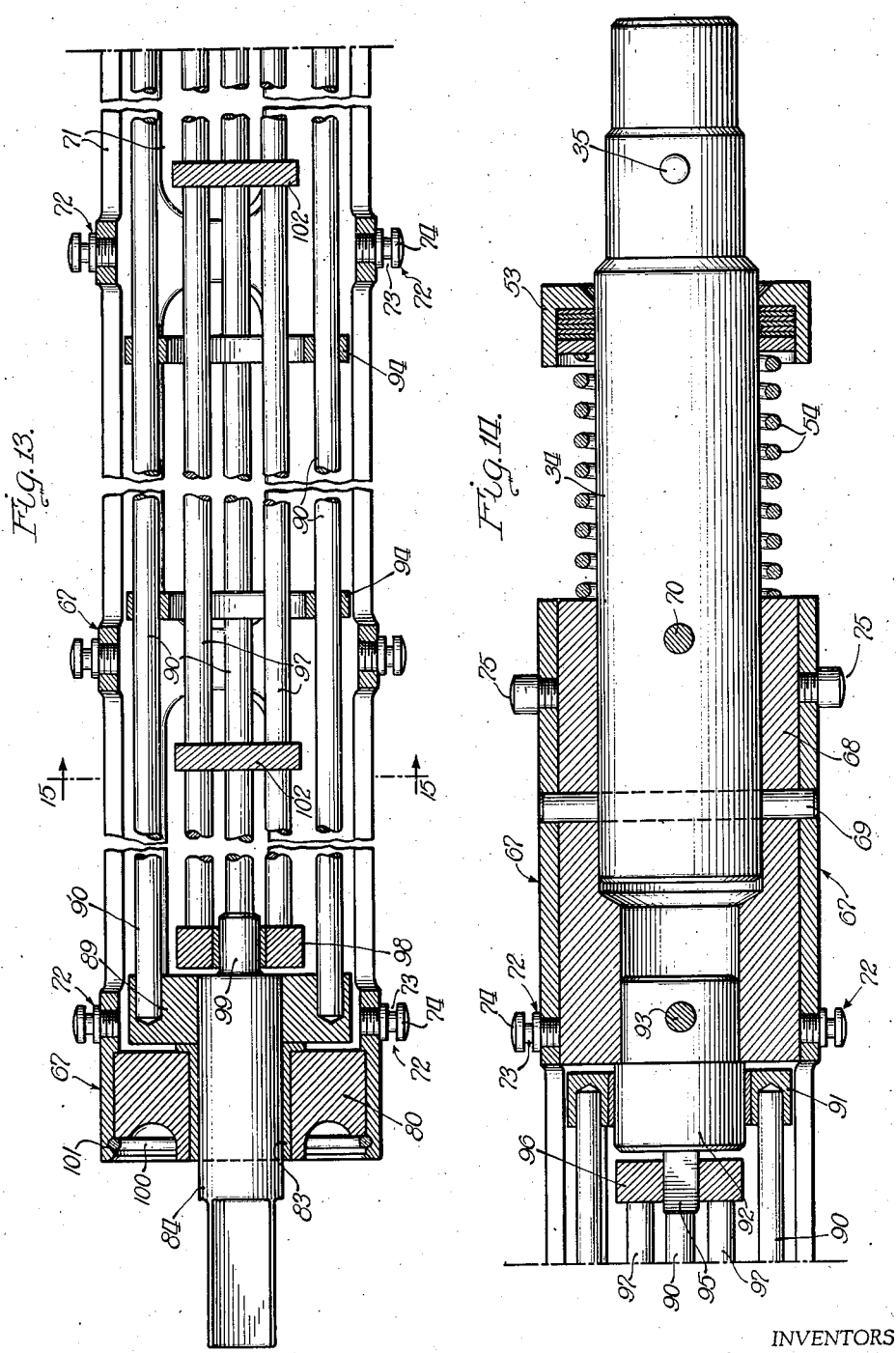
INVENTORS:
Charles F. Weinreich
Albert L. Voggenthaler
By: Norman E. H. Peletzke
ATTORNEY.

March 31, 1942.  C. F. WEINREICH ET AL  2,278,340
APPARATUS AND PROCESS FOR FREEZING ICE CREAM
Filed Feb. 23, 1940   5 Sheets-Sheet 5
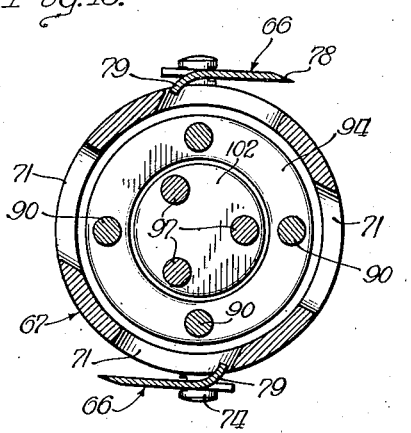
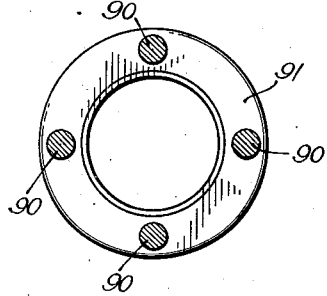
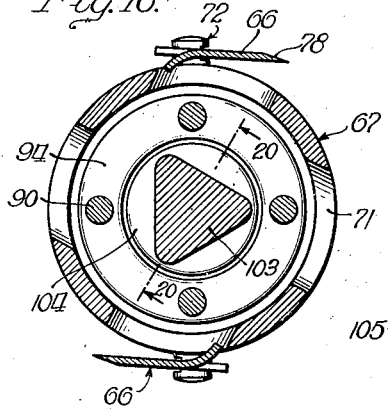
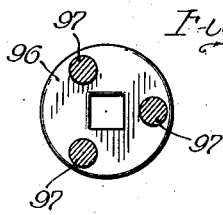
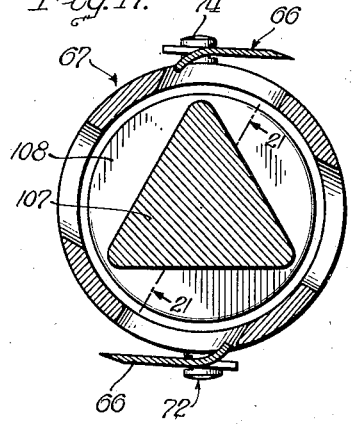
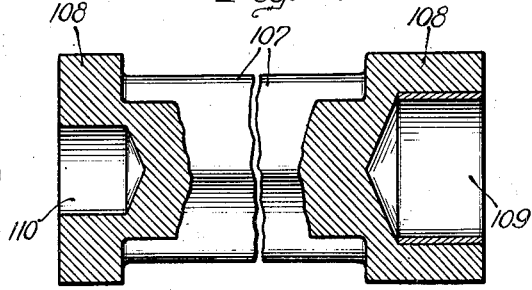
INVENTORS:
Charles F. Weinreich
Albert L. Voggenthaler
By: Norman E. H. Heletzke
ATTORNEY.

Patented Mar. 31, 1942

2,278,340

UNITED STATES PATENT OFFICE 2,278,340

APPARATUS AND PROCESS FOR FREEZING ICE CREAM

Charles F. Weinrich, Des Plaines, Ill., and Albert L. Voggenthaler, Cedar Rapids, Iowa, assignors to Cherry-Burrell Corporation, Wilmington, Del., a corporation Application February 23, 1940, Serial No. 320,402

35 Claims. (Cl. 62—114)

The present invention relates to a process and apparatus particularly adapted for use in the continuous freezing of ice cream and the like. More particularly the invention relates to a method which may be used for continuously producing substantially form-retaining ice cream having a predetermined overrun and in which a state of equilibrium has been attained by the substantial completion of the process of crystallization before the product leaves the processing chamber. The invention further relates to the novel construction of sanitary apparatus capable of carrying out the improved method.

It should, of course, be understood that the method and apparatus here described are intended primarily for use in the continuous manufacture of ice cream. However, the apparatus and the process are not limited specifically to the manufacture of ice cream.

The aspect of the present invention pertaining to the agitator and elements thereof is disclosed and claimed in our co-pending divisional application Serial No. 323,070, filed March 9, 1940.

In the construction of ice cream freezers, and especially in the construction of the agitation or whipping mechanism or elements therefor, it is essential that the construction be of sanitary design to enable the sanitary handling of the perishable foodstuffs, such as ice cream, processed in the apparatus.

In many types of ice cream freezers provided with agitator or whipping mechanisms comprised of a plurality of relatively rotatable elements, separate drive shafts are usually provided for the separately rotatable elements and these drive shafts enter the processing chamber through separate openings provided with the conventional packing boxes and seals. In the instant design of the agitator or whipping mechanism, though using a plurality of relatively rotatable elements which are readily detachable one from another, only one driving element enters the freezing chamber to provide the necessary power to drive the relatively rotatable elements. In this manner it has been possible to construct a very satisfactory and sanitary ice cream freezer.

In the continuous process of manufacturing ice cream as now commonly practiced the normal liquid ice cream mix, hereinafter referred to generally as mix, is usually forced to and through a refrigerated processing chamber, together with suitable quantities of gas, such as air, which are combined with the congealed ice cream mix in finely dispersed condition during the agitating and chilling operation within the processing chamber before the ice cream is expelled from the chamber.

It has been found that in the continuous manufacture of ice cream it is very essential that the refrigeration be properly and accurately controlled and that there be sufficient refrigeration or cooling capacity to effect a rapid crystallization or congealing of the ice cream mix upon the refrigerated surface of the processing chamber.

It has also been found that the degree or extent of agitation for whipping the combined mixtures of air, uncongealed ice cream mix and congealed ice cream mix to produce a homogeneous mass and the period of time during which such agitation and also the whipping takes place with respect to the period of time during which the ice cream is being processed within the processing chamber, as well as the pressure under which the process is carried out, are very essential and important elements which must be provided for and satisfactorily performed to produce a suitable ice cream. A suitable ice cream from the consumers' as well as from the manufacturers' standpoint possesses the qualities of fine texture, and desired richness and overrun at a temperature at which the product is substantially form-retaining and at which the ingredients of the processed ice cream have substantially reached a state of equilibrium before discharge from the processing chamber, whereby subsequent and further crystallization at the temperature of the ice cream is substantially prevented.

In some of the continuous freezers formerly used commercially, certain adjustments could be made to enable the attainment of one or more of the desired qualities in a commercially acceptable ice cream by the adjustment of the freezer to secure one or more of the necessary operating conditions to enable the production of such ice cream. However, in none of such freezers was it possible to attain all of the desirable results as to the quality of the ice cream and as to the satisfactory processing procedures thereof. It is also advantageous to be able to attain these results as to quality of ice cream and processing procedure through a reasonably wide range of critical conditions as, for example, a reasonably wide range of freezing temperatures, pressures, duration of processing period, and degree of agitation, and yet in each instance, regardless of the combination selected within these variable ranges, secure a completed ice cream product of desired texture, overrun, richness and in a completed state of processing.

The combination of ingredients united to form a commercial ice cream mix normally produces a complicated chemical solution. The changes which take place in such ice cream mix during the freezing or congealing, whipping and agitating process probably are the specific reasons for and are probably specifically related to the difficulties normally incurred in the processing of ice cream in a mechanism in which satisfactory provisions have not been made to secure the desired characteristics of the product as have been provided for in the apparatus constituting part of the instant invention.

In the freezing of ice cream it is desirable to freeze as great a portion of the crystallizable material, such as water, which normally crystallizes in the processing of ice cream, as quickly as possible after the introduction thereof into the ice cream processing chamber. This prompt freezing of the available water assures the formation of a vast number of infinitely small ice crystals in a minimum period of time.

The formation of such a large number of small ice crystals from the water available for crystallization at the time prevents the formation of large undesirable ice crystals in the ice cream during the processing procedure. To satisfactorily enable such a rapid crystallization process to produce a large number of small ice crystals, it has been found desirable to have a substantially large refrigerating surface in proportion to the volume of ice cream mix to be congealed or cooled in the processing chamber. A satisfactory relation of the refrigerating surface in the processing chamber to the volume of ice cream mix to be cooled, when taken in consideration with various other features of the processing procedure, has been found to be substantially of a ratio varying between 1:1 and 1:1½. A processing chamber having an internal diameter of not less than 4 inches and not greater than 6½ inches is particularly well suited. With such a ratio of surface to volume somewhere within the above indicated range, it has been found possible, using the presently available refrigerants, to satisfactorily cool the ice cream mix within the desired period of time while it is being processed within the processing chamber, as well as to allow such necessary capacity of the processing chamber to enable the satisfactory performance of other processing operations hereinafter referred to specifically.

Ice cream mix, as commercially compounded, contains a high percentage of solutes and the formation of a viscous compound is the obvious result upon the cooling of the mixture within the ice cream freezer. Upon the cooling of such a mixture containing crystallizable material dissolved therein, a point of super-saturation is quickly reached and some of the crystallizable material is crystallized out therefrom as quickly as the particles of the viscous compound can adjust themselves to reach a state of equilibrium at the reduced temperature to enable the freeing of the excess crystallizable material.

However, such a process of readjustment of the concentration of the ingredients of the particles of viscous material is not readily and quickly possible at reduced temperature when the viscosity of the material is great. It, therefore, requires an appropriate period of time, depending on the degree of agitation and pressure under which processing of the ice cream mix is carried out, to enable the particles of the viscous material to reach a state of equilibrium and to free for crystallization such excess water which may have been held in the super-saturated solution of viscous material at the reduced temperature to form an ice cream of maximum stiffness at the discharge temperature.

It is this delayed process of adjustment of the viscous material within the ice cream freezer which prevents the immediate extraction of the sensible as well as the latent heat from the crystallizable portions of the product which is introduced into the processing chamber. The extraction of such heat is, however, facilitated by the proper type of agitation and whipping within the processing chamber.

The extraction of a sufficient quantity of heat from the ice cream mixture as it is first introduced into the processing chamber immediately brings about the formation of the first minute ice crystals, causing thereby a further concentration of the solutions comprising the complicated chemical structure of the ice cream mixture as well as bringing about a greater viscosity of the product which subsequently tends to delay further and rapid readjustment.

The further concentration of the solution will, of course, necessitate a further reduction of the temperature of the entire mix within the processing chamber to again super-saturate the solutions to bring about a further release of crystallizable water from the viscous solutions. In the instant process this is attained by frequent re-exposures of the various particles of the ice cream mixture within the processing chamber to the refrigerated walls of the chamber, thereby causing a further cooling thereof and assuring that, upon such further cooling, the crystals formed on the refrigerated surface will be quickly scraped therefrom, resulting in the forming of ice crystals of a minute size whereupon the product is again intermingled and whipped. Such mechanical handling of the mixture within the processing chamber enables a more rapid completion of the chemical and physical changes taking place as well as producing a more homogeneous product in which all of the ingredients are well dispersed and in which the vesiculated or incorporated air, which has been intermingled with the mix to produce the desired overrun, is dispersed in minute, uniformly distributed air cells.

The repetition of the chilling process of the various particles of the mixture within the processing chamber and the alternate intermingling of the congealed mix with the mixture more remote from the refrigerated surface of the processing chamber, in which procedure a vast number of quickly formed ice crystals as well as minute air cells are uniformly dispersed throughout the entire product, continues the processing of the product within the refrigerated chamber for a sufficient period of time under the desired conditions of agitating, whipping, pressure and exposure to refrigerated surface to enable the attainment of a condition of maximum stiffness and substantial equilibrium in the viscous material within the processing chamber. By this method the freeing of a great portion of crystallizable material, and the crystallization thereof at the temperature of the product within the processing chamber, are made possible before the product is discharged from the super-atmospheric processing chamber. However, to further enable the crystallization process taking place in the ice cream mixture without additional cooling of the product before discharge from the freezer, the product is passed through a portion of the processing chamber immediately adjacent the discharge port generally indicated by the letter A in which the product is further agitated without the extraction of any appreciable heat.

Such a process enables the processing of a mixture of ice cream mix and air through a range of relatively low temperatures to produce an ice cream having form-retaining properties in which the process of crystallization at the temperature of the mixture within the freezer has been substantially completed and in which the crystalline structure is of minute order, resulting in a finely textured product.

It is one of the principal objects of this invention to provide a novel method and necessary satisfactory apparatus for continuously producing, in accordance with the process just set forth, a desirable ice cream having predetermined overrun and maximum form-retaining hardness at the discharge temperature corresponding to the type and degree of processing to which the product has been subjected and which product may be produced through a variable range of low temperatures under super-atmospheric pressures, which will also be of fine texture and which will have reached a state of equilibrium to prevent subsequent further crystallization of ingredients of the ice cream.

A further object of the present invention is to provide an agitator or scraper and whipping assemblage of simple, sanitary design in which the scraper and whipping elements are detachably secured together as a unit and are readily and easily detachable one from another, and in which the elements of the assemblage are removable and detachably retained together and in operative position within the processing chamber without the use of unsanitary mechanisms.

Another feature of this invention is to provide an agitator having a plurality of relatively movable members in which the movable members rotate in concurrent direction.

An additional important feature of this invention is the provision in an ice cream freezer of a processing chamber in which the ice cream, after being properly congealed and whipped, is further processed in a portion of the processing chamber, wherein the ice cream is not subjected to any substantial further refrigeration, to thereby permit the further completion of the crystallization process and the reaching of a state of equilibrium in the solutions comprising the ice cream mixture.

These and other objects, purposes and important features of this invention will be apparent to those skilled in the art from the description of the invention and the appended claims when read in connection with the accompanying drawings in which:

Figure 1 is a general elevational view partially in broken away section showing the general arrangement of the freezing chamber, agitator drive, discharge connections and supply connections.

Figure 2 is a plan view of the improved scraping blade.

Figure 3 is a cross sectional view taken along line 3—3 of Figure 2.

Figure 4 is a view partially in broken away section of the discharge control valve.

Figure 6 is a plan view of the outer tubular agitator element.

Figure 7 is a plan view of the improved scraping blade in relative position to the outer agitator element shown in Figure 6.

Figure 8 is a perspective view of the spring ring for maintaining the dasher in assembled order.

Figure 9 is a plan view of the intermediate dasher element.

Figure 10 is a perspective view of the inner displacement spider of the front cylinder head.

Figure 11 is a plan view of the inner dasher element.

Figure 12 is a perspective view of the assembled dasher and inner sectional cylinder head in relative order of assembly.

Figure 13 is a longitudinal sectional view of the front end of the assembled dasher.

Figure 14 is a longitudinal sectional view of the rear portion of the assembled dasher.

Figure 15 is a cross sectional view of the assembled dasher taken along a section generally indicated by line 15—15 of Figure 13.

Figure 16 is a cross sectional view of a modification of the dasher shown in Figure 15 in cross section in which the inner member is solid and of triangular cross section.

Figure 17 is a cross sectional view of a further modified dasher having a solid triangularly cross sectioned inner member and in which the dasher consists only of an outer and an inner member.

Figure 18 is a cross sectional view of the intermediate dasher member taken along line 18—18 of Figure 9.

Figure 19 is a cross sectional view of the inner dasher member taken along the line 19—19 of Figure 11.

Figure 20 is a cross sectional view partially in outline of the solid inner dasher element shown in Figure 16 taken along the line 20—20 of Figure 16.

Figure 21 is a cross sectional view partially in outline of the solid inner dasher element shown in Figure 17 taken along the line 21—21 of Figure 17.

Figure 5:
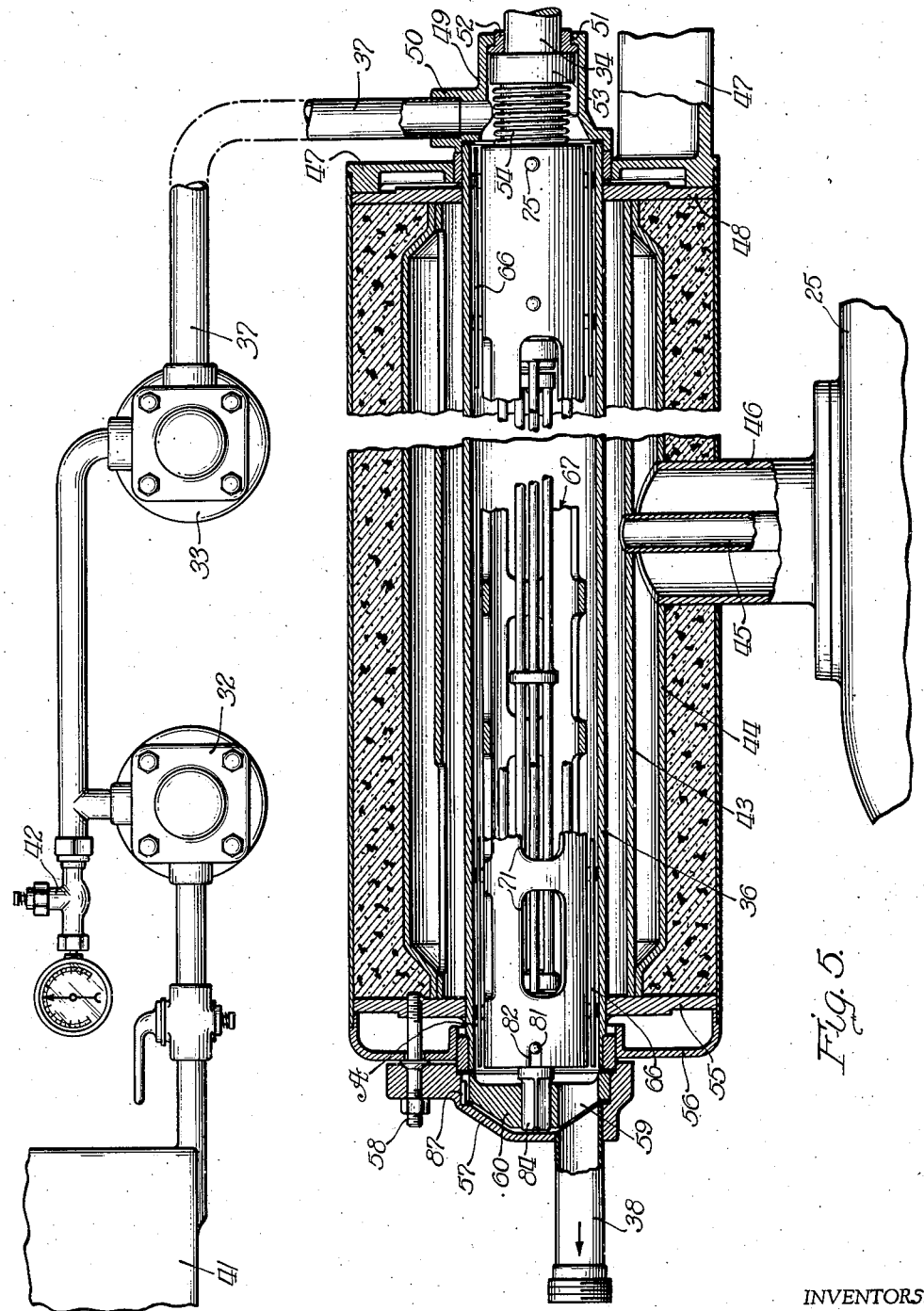
Figure 5 is a side elevational view of a freezer partially in broken away section showing the supply pumps schematically.

Referring to the illustrations showing the invention in its preferred form, like numerals being associated with like elements, 25 is a freezer base housing a refrigerant control and circulating system 26 and an agitator and pump mechanism driving unit 27. Through driving belts 28 and pulleys 29 power is supplied to the main driving shaft 30 which is fixed to a suitable pulley 31 to transmit power through any suitable arrangement of belts and pulleys to the mix pumps 32 and 33.

The front end of the drive shaft 30 is keyed by shear pin 35 to the stud shaft 34 rigidly fixed to the rear portion of the freezer agitator mechanism. The ice cream mix pumps 32 and 33 supply the ice cream mix as well as air or other suitable gas in metered and predetermined proportionate quantities under super-atmospheric pressure to the interior of the processing chamber or freezing tube 36 through the supply pipe 37.

The processed ice cream is discharged from the opposite end of the processing chamber 36 in a completely processed condition through the discharge conduit 38. From the discharge conduit 38 the processed ice cream passes through the discharge control valve 39 to any type of conventional can filler or package filler generally indicated by the numeral 40.

The ice cream mix, more commonly referred to as mix, is supplied to the mix pumps 32 and 33 from any suitable supply chamber generally indicated by the numeral 41. The air or other suitable gas is supplied to the conduit joining the pumps 32 and 33 through an air or gas valve generally indicated by the numeral 42. The operation of the mix pumps 32 and 33 and the air valve 42 is completely set forth in United States Patent No. 1,907,486.

The freezing chamber 36 is surrounded by concentric inter-connected refrigerant jackets 43 and 44 operatively connected with refrigerant supply and discharge passages 45 and 46, respectively. The fundamental arrangement of the refrigerant jackets and supply and discharge connections and other elements associated with the supply and accurate control of the refrigerant for use in cooling the processing chamber 36 is constructed substantially in accordance with the general arrangement as set forth in United States Patent No. 2,132,932.

It is to be noted, from an examination of Figure 5, that the refrigerant jackets 43 and 44 do not extend through the entire length of the processing tube 36. A portion of the processing chamber 36 at the head end thereof is not subject to the action of the refrigerant medium in the refrigerant jacket and the ice cream leaving the freezer will, before so leaving the freezer, pass through a portion of the processing chamber immediately adjacent the head end thereof in which it is further processed without being subjected to further substantial refrigeration. The precise proportionate length of the freezing chamber which is not subjected to refrigeration depends entirely upon the type of agitation to which the ice cream therein may be subjected after leaving that portion of the freezer in which it is cooled so as to permit the further completion of the crystallization process and the reaching of a state of equilibrium within the substantially completed ice cream product.

The entire assemblage of the freezing tube 36 and refrigerant jackets 43 and 44 is insulated and jacketed in any conventional manner. The entire arrangement of freezing tube or processing chamber 36 and associated refrigerant and insulation jackets is supported upon the base 25 by the refrigerant discharge conduit 46 and the extension of the rear gear housing 47 which is secured in any conventional manner to the rear end plate 48 of the refrigerant jacket assemblage.

The rear head 49 of the freezing or processing tube 36 is attached to the tube 36 in any conventional manner, such as by screw threads or welding, and is provided with a laterally extending opening 50 to receive the end of the mix supply line 37. The rear head 49 is also provided with an axial opening 51 concentric with the processing tube 36 and is provided with a radial end thrust bearing 52 to support the stud shaft 34 fixed to the rear portion of the ice cream freezer agitator mechanism. To seal the entrance of the shaft 34 through the bearing 52 a rotary seal generally indicated by the numeral 53 is provided. The rotary seal, when the agitator is assembled within the processing chamber, is held in sealing position against the thrust bearing 52 by a compression spring 54.

The front end of the refrigerant jacket arrangement is closed and sealed to the processing tube or chamber 36 by a front end plate 55 to which is fastened a jacket head 56 also secured to the front end of the processing tube 36 exteriorly of the refrigerant jacket. A front cylinder head 57 for the tube 36 is securely fastened in a detachable manner to the end plate 55 by any convenient arrangement, such, for example, as bolts 58. The discharge conduit 38 is fixed in an aperture in the cylinder head 57 and communicates with a discharge passage 59 in the displacement spider 60 fitted into the inner depression of the cylinder head 57.

The discharge control valve 39 is adapted to regulate the pressure within the processing chamber or freezing tube 36 by restricting the flow of the finished ice cream discharging from the processing chamber 36 through conduit 38. As the finished ice cream flows through the conduit 38 and the control valve 39 past the adjustable spring-biased valve plunger 62, it tends to move the plunger 62 away from the plunger seat 63, thereby moving the plunger 62 into a position compressing the spring 64 which normally biases the plunger 62 toward the plunger seat 63. The compression of the spring 64 is adjusted by means of the adjusting screw 65.

The general construction of the freezing or processing tube, the ice cream mix and air supply pumps and valves, refrigerant jackets enveloping the processing chamber, refrigerant supply and regulating system, motor drive connections for the agitator mechanism and pumps, as well as the discharge valve and can filler, all of which have been previously described, are all of a type now common in commercial constructions of ice cream freezers. They have been here described for the purpose of explaining the mechanism which is associated with and necessary in the operation of the improved mechanical features of the freezer dasher and for the satisfactory practice of the process heretofore described even though they do not constitute an essence of the invention.

On the interior of the processing chamber 36 and extending longitudinally throughout the entire length thereof is housed a compound agitator or mutator of two or more relatively movable elements and scraping blades 66. As illustrated in Figures 2, 5 to 15, 18 and 19, the mutator or agitating mechanism is comprised of a tube-like outer element 67 somewhat less in diameter than the internal diameter of the processing tube or chamber 36 and rotatively supported concentrically within the cylinder 36.

In the rear portion of the hollow outer agitator element 67 is provided a concentric tubular element or reducing member 68 keyed to the outer agitator element 67 by keys 69 and 70 which also lock the one end of the stud driving and supporting shaft 34 into fixed central position in the outer end of the element 68. On the portion of the stud shaft 64 extending out of the element 68 is provided a rotary seal 59, its compression spring 54 and a key-way for the fracturable drive key 35 for drivingly engaging the main drive shaft of the freezer, all as previously described.

The outer tubular agitator element 67 is provided with four sets of elongated apertures 71, each set being disposed at an angle of ninety degrees to the adjacent set and each set consisting of a plurality of elongated apertures 71 longitudinally arranged in end-to-end alinement extending substantially throughout the entire length of the agitator element 67.

The ice cream mix pumped to and through the processing chamber 36 by the mix pumps 32 and 33 tends to congeal and adhere to the refrigerated surface of the processing chamber as it passes along the slender annular passage formed between the outer periphery of the outer agiator element 67 and the inner periphery of the tubular processing chamber 36. To maintain this annular slender passage free of congealed ice cream, two diametrically oppositely disposed scraping blades 66 are provided to scrape the congealed mix from the refrigerated inner surface of the processing chamber. The scraping blades 66 are supported on the outer rotary agitator element 67 by two longitudinally extending diametrically opposed rows of blade supporting studs 72 projecting outwardly from the outer agitator element 67. Each row of studs 72 is arranged in substantial alinement with the rear edge of a row of elongated apertures 71.

The studs 72 may be secured to the outer rotary element 67 in any desired manner. Each stud 72 has a reduced neck 73 and a head 74. At the one end of the outer agitator element 67 there are additional locking studs 75 having a cylindrical outer end alined with the studs 72.

The scraping blades 66 are provided with keyhole openings 76 for the studs 72 and a circular opening 77 for the studs 75. All of these openings are arranged in alinement lengthwise of the blades and they are offset from the opposite side of the longitudinal center line of the blades from the scraping edge 78.

The rear edge of each scraping blade 66 is provided with serrations 79, every other one of which is inclined at an angle to the plane of the blade 66 and extends from the blade toward the outer tubular agitator element 67 when the blade is mounted thereon in operative position. When so mounted the blade 66 substantially overlies a row of apertures 71 in the wall of the tubular outer agitator element 67.

The scraping edge 78 of the blade 66 is then substantially above the front edge of the apertures 71 but slightly removed therefrom while the ends of the inclined serrations 79 at the rear edge of the blade 66 are just inside of the apertures 71 adjacent the rear edges thereof. Obviously the inclined serrations 79 will guide and direct the congealed ice cream mixture scraped from the refrigerated wall of the chamber 36 into the hollow interior of the outer agitator element 67 through the apertures 71 immediately below the blade 66. The ice cream mix so directed into the hollow interior of the outer agitator element 67, after being thoroughly whipped while therein by whipping members hereinafter described, passes out from the interior of the outer agitator element 67 through the two remaining sets or rows of longitudinal apertures 71 disposed at an angle of ninety degrees to the row of apertures 71 immediately below the scraping blades.

To mount a scraping blade in position on the outer agitator element 67, the round part of the keyhole openings 76 is engaged with the heads 74 of the studs 72 and then the blade is moved lengthwise to engage the elongated parts of the keyhole openings with the necks 73 of the studs 72. The openings 77 are then engaged with the outer ends of the studs 75 which hold the blade in locked position on the studs 75 with the elongated parts of the keyhole openings engaged with the necks and beneath the heads of the studs 72. Obviously to enable such a mounting of the scraping blades 66 it is necessary that they be flexible to permit the essential bending incidental to such manipulation of the scraping blades.

The necks 73 of the studs are slightly smaller than the elongated parts of the keyhole openings 76 and they are longer than the thickness of the blade 66 so that, when the blade is securely locked on the studs, it is loosely retained and is capable of rocking transversely, that is to say, it is capable of movement both radially and tangentially of the rotatable agitator body 67. Since the keyhole openings in the blade are closer to the rear edge thereof than to the scraping edge 78 thereof, the greater part of the width of the blade is located in front of the studs and above the apertures 71 in the outer agitator element 67.

The pressure of the congealed material scraped from the inner periphery of the processing chamber 36 against the under side of the scraping blade in front of the studs in conjunction with the centrifugal force when the agitator is rotating holds the scraping edge 78 of the blade in close contact with the refrigerated wall of the freezing chamber and in substantial tangential relation therewith. The scraping blade is preferably made of thin non-corrosive material, such as stainless steel, and is sufficiently flexible longitudinally and transversely to permit it to be easily mounted on or removed from the outer agitator element.

The front or head end of the outer agitator element 67 is supported for rotation upon a centrally apertured solid spider element 80 telescopically fitted into the front end of the outer agitator element 67 and keyed thereto by a lug 81 on the outer periphery of the spider 80 which engages the slot 82 in the end of the tubular element 67. The spider 80 is swiveled for rotation on the thrust bearing 83 carried by the front stud shaft 84 which at its front free end is splined to and supported in a central aperture 85 having clutching faces 86 in the front displacement spider 60.

The front displacement spider 60 is provided at its lower side with the discharge aperture 59 alined with the discharge aperture in the dished front cylinder head 57 into which dished portion the displacement spider is closely fitted and supported co-axially with the processing chamber 36. The displacement spider 60 is prevented from rotating by a key 87 in the front cylinder head 57 which engages a key-way 88 in the outer periphery of the displacement spider 60.

The inner end of the stud shaft 84 is rigidly fixed to the front spider 89 of the intermediate whipping or agitating element which is comprised of a series of longitudinally extending beating rods 90. The beating rods 90 are arranged in a circular formation of uniform radial extent from the central axis of the processing chamber 36 which is also the axis of the agitating mechanism and are positioned slightly within the inner periphery of the agitating element 67. The opposite ends of the beating rods 90 of the intermediate agitator element are fixed to an annular rear spider 91 mounted for relative rotation upon a central inwardly extending pivot 92 keyed to the inner end of the centrally apertured member 68 by key 93. Intermediate their ends the rods 90 of the stationary intermediate element are braced by annular bracing spiders 94.

The inner reduced central portion 95 of the rear internal pivot 92 is splined to a rear spider 96 of the internal whipping or agitating element to support and rotate the same concurrently with the rotation of the outer dasher element 67 to which the pivot 92 is operatively connected. The inner whipping or agitating element rotates in the same direction as does the outer agitator element, both rotating relative to the intermediate whipping or agitating element.

The inner agitator element is composed of longitudinally extending beating rods 97 radially disposed in triangular formation from the central axis of the processing chamber 36 and within the intermediate agitating element. The front end of the beating rods 97 of the internal agitating element are fixed or mounted in an annular spider 98 rotatively supported on a central pintle 99 on the inner end of the front stud shaft 94. Intermediate their ends the inner whipping rods 97 are braced at intervals by disk-like spider elements 102.

The lengths of the various agitator elements, i. e., the hollow agitator element, the intermediate stationary agitator element and the internal rotary agitator element, are such that, when assembled in order as shown in Figures 13 and 14, the stud shafts 84 and 34 and the associated elements of the agitator mechanism are positioned in spaced axial alinement so as to permit the free rotation one within another of the relatively rotatable elements. To prevent the separation of the elements when assembled as shown, a lock ring 100 is engaged in a complementary annular groove 101 on the outer agitator element 67. The lock ring 100 prevents the outward movement of the spider 80 which is swiveled on the bearing 83 carried by the front stud shaft 84 and which is prevented from moving inwardly by abutting against the front spider 89 of the intermediate whipping element which is permanently fixed to the inner end of the front stud shaft 84. The intermediate whipping element is prevented from inward longitudinal motion by the engagement of the rear spider 99 thereof with the element 68 in the outer agitator element 67. In this manner longitudinal motion of the intermediate agitator element in either direction and, therefore, also longitudinal motion of the inner agitator element in either direction is prevented.

To disassemble the hollow mutator or multi-sectioned agitator element it is only necessary to remove the clip ring 100 and withdraw the intermediate and inner agitator elements from the outer agitator element. The disassembly of the agitator mechanism is then completed by withdrawing the inner agitator element from the intermediate agitator element and removal of the scraping blades from the outer tubular agitator element 67. It is to be noted that, with the exception of the scraping blades, the various relatively rotatable elements of the entire dasher or agitator assembly are locked in operative position with respect to one another by the single clip ring 100, thereby providing a very sanitary and simple agitator construction easy to disassemble and, when disassembled, easy to clean. To assemble the dasher or agitator mechanism the reverse procedure of that set forth above may be followed.

To mount the agitator for operation within the processing chamber it is inserted thereinto a sufficient distance so that the stud shaft 34 may be keyed to the main drive shaft 30, as indicated in the figures. The front displacement spider 60 is then placed in the front cylinder head 57 with the key 87 engaged in the key-way 88 and the assembled cylinder head 57 and displacement spider 60 are then placed in position over the open head end of the processing chamber 36 with the free end of the front supporting shaft 84 splined to the displacement spider 60.

To secure the cylinder head 57 in place the retaining bolts 58 are then tightened to seal the processing chamber. When so assembled, the outer and inner agitator elements, upon the rotation of the main drive shaft 30, will rotate together in the same direction while the intermediate agitator element will remain stationary due to the fact that it is splined to the stationary displacement spider 60.

This arrangement of outer, intermediate and inner agitator elements comprised primarily of the outer agitator element 67 and the beating rods 90 and 97 produces an agitating chamber in which three sets of elements move relatively with respect to one another when the freezer is in operation. Into and through this agitating chamber the congealed mixture scraped from the refrigerated inner periphery of the processing chamber is directed by the inclined serrated portions of the rear edges of the scraping blades to be agitated and blended therein to produce a homogeneous mass.

In Figures 16 and 20 are shown views of modifications of an agitator mechanism in which the inner agitator element is comprised of a solid triangular element 103 provided with end spiders 104 having a central socket 105 in the front spider and a socket 106 in the rear spider for supporting and engaging the reduced portion 95 of the rear pivot 92 in splined relation therewith while the front socket 105 rotatably engages the front pintle 99.

In Figures 17 and 21 are shown views of a further modified agitator element in which only one whipping element is provided on the interior of the outer tubular element 67. In this modification the single internal element 107 is of triangular cross section provided with end spiders 108. The rear end spider 108 is provided with a socket 109 to rotatably engage the rear pivot 92 while the front spider 108 is provided with a socket 110 to engage the inner end of the front stud shaft 84 in a pressed fit so that the inner element 107 will be held in non-rotative relation relative to the processing chamber.

In the use of the ice cream freezing mechanism just described in detail, ice cream mix is continuously provided in metered quantities by the mix pump 32 to the intermingling mix and air pump 33 which is of greater capacity than the pump 32. Pump 33 is supplied with a predetermined quantity of air through valve 42 to be intermingled in pump 33 with the ice cream mix from pump 32, which mix and air, after being intermingled, is positively forced under super-atmospheric pressure, not substantially less than fifteen pounds per square inch gauge, through conduit 37 into the rear portion of the processing chamber 36. The ice cream mix and air is then forced through the slender annular passage formed between the rear portion of the outer agitator element 67 and the refrigerated wall of the processing chamber 36 toward the front or discharge end of the ice cream freezer at the same pressure as just mentioned. After leaving the refrigerated portion of the processing chamber the cooled and agitated mix and air then passes into the unrefrigerated portion of the processing chamber, generally indicated by the letter A, to be further whipped. During this whipping process further completion of the crystallization of ice takes place.

While passing through the processing chamber 36 the ice cream mix contained in the interior of the processing chamber is of such a quantity measured in cubic inches and the refrigerated periphery of the processing tube 36 is of such an area measured in square inches that the ratio of the refrigerated surface in square inches to the content of ice cream mix and air within the processing chamber is of a ratio varying between 1:1 and 1:1½. The capacity of the processing chamber and the rate of supply of ice cream mix and air by the pumps 32 and 33 through the conduit 31 to the processing chamber are of such relative proportion that the ice cream mix requires approximately from one to three minutes to pass through the entire processing chamber while being processed therein to a maximum stiffness and substantial completion of crystallization at the temperature of the discharged ice cream.

The reaction of the interminged ice cream mix and air as it is being processed, during which time crystallizable water is crystallized and the various solutions constituting the ice cream mix become more viscous, has been set out in detail in the forepart of this application. It is, however, desired to point out that the above surface to volume ratio which has been found to be extremely satisfactory to produce suitable qualities in ice cream and the relative relations between the quantities of mix supplied to the processing chamber and the capacities thereof to produce therefrom substantially form-retaining ice cream of maximum stiffness in a given time and at a given temperature, all as set forth specifically above, combine to enable the production of an ice cream in which a state of equilibrium has been substantially reached in the solutions comprising the processed ice cream. This improved process permits the substantial completion of the crystallization process before the ice cream is discharged from the super-atmospheric pressure freezer. It is this relation of freezing pressure, agitation, period of processing, surface to volume ratio, and maximum stiffness of product at the discharge temperature, which is made possible by the construction of a freezer in accordance with the specifications set forth above, when practicing the afore-described improved process.

By this process a substantially stable ice cream of maximum stiffness may be produced through a reasonable range of variations in each of the critical conditions of temperature of product, pressure of processing, period of processing and surface to volume ratio.

The foregoing detailed description of the apparatus and process has been given for clearness of understanding only and no unnecessary limitations shall be understood therefrom. Various changes in the arrangement of the numerous elements of the apparatus, as well as in the steps of the process, as described to explain the invention, may be made in accordance with the common knowledge of those skilled in the art and yet come within the scope of the invention as set forth in the appended claims.

The invention is hereby claimed as follows:

1. In an apparatus for manufacturing ice cream by the continuous method, the combination of a freezing cylinder having admission and discharge ports, means for continuously flowing metered quantities of partially crystallizable ice cream mix under super-atmospheric pressure to and through the freezing cylinder, means for continuously flowing quantities of gas to and through the freezing cylinder at a rate necessary to produce the desired proportion of gas and mix in the discharged product, means at the discharge port of said cylinder to adjustably control the pressure within the cylinder, means for refrigerating the freezing cylinder to cause a congealing of the ice cream mix upon the freezing cylinder by crystallizing a portion of the ice cream mix thereon, and scraping means within the cylinder for scraping the congealed portion of the ice cream mix from the freezing cylinder and directing it into a whipping mechanism, said freezing cylinder having a freezing surface in proportion to its volumetric content of ice cream mix and gas varying in ratio between 1:1 and 1:1½, said means for flowing ice cream mix and said means for flowing gas through said freezing cylinder being of capacities sufficient to cause the ice cream mix and gas to flow under super-atmospheric pressure not substantially less than fifteen pounds per square inch gauge from the admission port to the discharge port in a period of time varying from one to three minutes when producing a product of substantially form-retaining stiffness when discharged from the freezing cylinder.

2. In an apparatus for manufacturing ice cream by the continuous method, the combination of a freezing cylinder having admission and discharge ports, means for continuously flowing metered quantities of partially crystallizable ice cream mix under super-atmospheric pressure to and through the freezing cylinder, means for continuously flowing quantities of gas to and through the freezing cylinder at a rate necessary to produce the desired proportion of gas and mix in the discharged product, means at the discharge port of said cylinder to adjustably control the pressure within the cylinder, means for refrigerating the freezing cylinder to cause a congealing of the ice cream mix upon the freezing cylinder by crystallizing a portion of the ice cream mix thereon, scraping means within the cylinder for scraping the congealed portion of the ice cream mix from the freezing cylinder and directing it into a whipping mechanism, said freezing cylinder having a freezing surface in proportion to its volumetric content of ice cream mix and gas of a ratio varying between 1:1 and 1:1½, said means for flowing ice cream mix and said means for flowing gas through said freezing cylinder being of capacities sufficient to cause the ice cream mix and gas to flow under super-atmospheric pressure not substantially less than fifteen pounds per square inch gauge from the admission port to the discharge port in a period of time varying from one to three minutes when producing a product of substantially form-retaining stiffness when discharged from the freezing cylinder, and a whipping mechanism comprising an outer rotatable carrying member, an inner rotatable whipping member rotatable in concurrent direction with the outer carrying member and a stationary whipping member intermediate said rotatable carrying member and said inner rotatable whipping member for uniformly dispersing the congealed portion of the ice cream mix with the uncongealed portion of the ice cream mix within the freezing cylinder and to produce an ice cream in which substantially all crystallization within the ice cream mix at the temperature of the ice cream as it leaves the freezer has been completed.

3. A machine for processing ice cream including a refrigerated cylindrical processing chamber, scraping and whipping means within said chamber including a hollow, rotatable, apertured blade support forming with the cylindrical wall of the processing chamber a substantially annular passage for exposing ice cream to the refrigerated cylindrical processing chamber wall, scraping blades extending from the hollow rotatable support substantially to said cylindrical wall, means for rotating said rotatable support and scraping blades relative to said cylindrical wall, means for introducing ice cream mix and gas into said refrigerated cylindrical processing chamber and forcing it therethrough, means on said scraping blades for directing the ice cream into the hollow rotatable support through the apertures therein, and relatively rotatable whipping means within said support for whipping said ice cream to effect a finely dispersed incorporation of the gas into the ice cream mix.

4. The method of continuously producing ice cream which consists in rapidly withdrawing heat from a portion of a flowing stream of ice cream mix and gas while passing through a cylindrical refrigerated processing chamber containing an agitator and scraping blades to reduce the temperature thereof to a temperature at which a substantial portion of the available crystallizable elements of the ice cream mix may be crystallized, directing the portions of the ice cream mix scraped from the refrigerated chamber by said scraping blades away from the refrigerated surface, blending said crystallized portion with a higher temperatured and substantially uncrystallized portion of the ice cream mix not directly exposed to the refrigerated surface to blend and equalize the temperatures thereof, causing further crystallization in the blended mixture by re-exposure thereof to the direct action of the refrigerating medium associated with the refrigerated chamber, and repeating said blending operation for a sufficient period of time to enable the substantial completion of the crystallization of all crystallizable elements at the temperature of the product at the completion of the processing operation.

5. An ice cream freezer comprising, in combination, relatively movable surfaces defining a substantially slender flow passage, one of said surfaces being maintained at a freezing temperature, means for flowing metered quantities of ice cream mix and gas through said flow passage, means for scraping congealed mix from said surface maintained at a freezing temperature and directing it into a whipping mechanism substantially equal in length to the length of the relatively movable surfaces and in which mechanism the frozen ice cream mix and unfrozen ice cream mix and the gas are whipped together in a semi-enclosed chamber, and discharge means in said semi-enclosed chamber to permit the discharge of the whipped ice cream mix and gas therefrom for re-exposure to the freezing surface.

6. An ice cream freezer comprising, in combination, relatively movable surfaces defining a slender sequentially interrupted flow passage, only part of one of said surfaces being maintained at a freezing temperature, means for flowing metered quantities of ice cream mix and gas through said interrupted flow passage, means for scraping congealed mix from said surface maintained at a freezing temperature and directing it into a whipping mechanism in which the ice cream mix and gas are whipped together in a semi-enclosed chamber, discharge means in said semi-enclosed chamber to permit the discharge of the whipped ice cream mix and gas therefrom for re-exposure to the freezing surface, and a whipping compartment formed by the same relatively movable surfaces and substantially devoid of effective refrigeration and adapted to receive material from said interrupted flow passage for further whipping of the material under conditions free of substantial further refrigeration.

7. A freezer comprising an elongated tubular freezing chamber having an inlet means and outlet means at opposite ends, means for refrigerating said chamber, a revolvable, apertured, substantially tubular surface extending longitudinally within said chamber and defining with the wall of the freezing chamber a substantially slender flow passage, agitator means within said substantially tubular surface, means for flowing partially crystallizable ice cream mix and air in predetermined proportionate quantities through said flow space, and scraping means carried on said tubular surface and extending substantially to the walls of said freezing chamber for scraping congealed ice cream mix from said tubular surface, means for causing a flow of said congealed ice cream mix, uncongealed ice cream mix and air into the tubular surface through the apertures therein, and means for permitting the discharge of the agitated ice cream mix and air from the inside of the tubular surface after the agitation thereof for re-exposure of the blended and agitated materials to the refrigerated surface of the processing chamber.

8. In an ice cream freezer, the combination of a cylindrical freezing chamber for continuously congealing ice cream mix and incorporating gas therein in a finely dispersed state, an inlet and an outlet in said freezing chamber, inner and outer members mounted to rotate within said chamber in different paths measured radially thereof, scraping means carried by said outer member and extending substantially to the inner periphery of the wall of said chamber, a stationary agitator member intermediate said inner and outer members radially of said chamber, apertures in said outer member for the passage of ice cream mix and gas into and out of said outer member, means for directing the flow of congealed material scraped from said freezing chamber by said scraping blades into and through said outer rotary member, and means for rotating said rotary members for agitating the material within said freezing chamber.

9. In a continuous freezer, the combination of a cylindrical processing chamber, means for refrigerating the peripheral wall of said chamber, a tubular rotary element having means for scraping said wall, said rotary element being arranged to define together with said wall a slender annular cooling passage, entrance and discharge apertures in the peripheral wall of said tubular rotary element, means for continually causing ice cream mix and gas to flow through said cooling passage under super-atmospheric pressure, separate means for causing the flow of uncongealed ice cream mix, gas and congealed ice cream mix through the tubular rotary element, and beating means within said tubular rotary element to cause a mixing of uncongealed ice cream mix with the congealed ice cream mix and to finely disperse and incorporate quantities of gas in minute cells within the blended ice cream mix while the same passes through the tubular rotary element.

10. The process of continuously manufacturing ice cream to effect substantially complete crystallization in minute crystals of a substantial portion of crystallizable materials in the ice cream mix at the temperature of the processed material which consists and in continuously and concurrently passing the ice cream mix and gas through a processing chamber having a refrigerating medium associated therewith, continuously scraping crystallized ice cream mix from the refrigerated surface of the processing chamber, directing the scraped away portions of ice cream mix away from the refrigerated surface and blending it with less congealed portions of the mix not directly exposed to the refrigerated surface, causing further crystallization in the blended mixture by re-exposing the blended mixture to the direct action of the refrigerating medium associated with the processing chamber, and repeating this procedure for a sufficient period of time to effect a substantial completion of the crystallization of the crystallizable portion of the ice cream mix crystallizable at the temperature within the processing chamber.

11. In an ice cream freezer, the combination of a cylindrical processing chamber, means for refrigerating the processing chamber, an agitator member within said chamber extending substantially throughout the entire length thereof and forming with the inner periphery of said chamber a sequentially interrupted slender flow passage, scraping means carried on the outer surface of said agitator element and extending substantially to the inner periphery of said processing chamber, beating means within said agitator element and extending substantially throughout the entire length thereof, means for continuously forcing metered quantities of ice cream mix and gas along said slender flow passage to congeal a portion thereof on the inner periphery of said processing chamber, and means for directing the congealed portions scraped from said refrigerated surface by said scraping blades through the agitator element at the points of interruption of said interrupted flow passage to be beaten and blended by the beating means within said agitator element before the materials directed into said agitator element are re-exposed to the refrigerated wall of the processing chamber.

12. The process of manufacturing ice cream having a predetermined overrun and in which the crystallization process is substantially completed at the temperature within the processing chamber before the ice cream leaves the processing chamber which consists in continuously passing partially crystallizable ice cream mix and gas under super-atmospheric pressure not substantially less than fifteen pounds per square inch gauge in predetermined relative proportions through a processing chamber, said processing chamber having a ratio of refrigerated surface measured in square inches to volume of ice cream mix and gas measured in cubic inches varying between a range of 1:1 and 1:1½, refrigerating the processing chamber for varying the temperature of the ice cream mix and gas within the processing chamber and congealing a portion of the mixture by crystallization upon the inner periphery of the processing chamber, scraping the congealed portion of the ice cream mix from the refrigerated surface and passing it into a beating mechanism together with gas and the uncongealed portion of the ice cream mix, beating together the congealed ice cream mix, the uncongealed ice cream mix and the gas within the beating mechanism, repeatedly passing the beaten mixture out of the beating mechanism into intimate contact with the refrigerated surface to further congeal portions thereof, redirecting the further congealed portion together with the less congealed ice cream mix and gas into the beating mechanism for further beating, and repeating this procedure for a period of from one to three minutes to thereby substantially complete the crystallization of the portions of the ice cream mix crystallizable at the temperature within the processing chamber to produce a substantially form-retaining ice cream having uniformly dispersed ice crystals and vesiculated gas of predetermined proportion relative to the quantity of ice cream mix before discharge of the completed ice cream from the processing chamber.

13. The process of manufacturing ice cream having incorporated therein a predetermined quantity of vesiculated gas consisting in causing a continuous flow of a mixture of predetermined quantities of ice cream mix and the necessary quantities of gas to be incorporated therein under super-atmospheric pressure through a processing chamber, subjecting the surface of the processing chamber to the action of a refrigerant to thereby cool the mixture, causing a portion of the ice cream mix to rapidly congeal and crystallize on the surface of the processing chamber, rapidly scraping off the congealed and crystallized portion and blending it with the remainder of the mixture, agitating the entire mixture while subjecting it to continued refrigeration for a period sufficient to permit the substantial completion of the crystallization of a substantial portion of the crystallized ice cream mix, whipping the agitated and refrigerated mixture without further substantial refrigeration under the same conditions of pressure existing in the refrigerated processing chamber, and gradually reducing the pressure upon the processed mixture during discharge thereof from the processing chamber.

14. The process of manufacturing ice cream containing a predetermined proportion of vesiculated gas which consists in concurrently and continuously flowing a mixture of partially crystallizable ice cream mix and gas in predetermined proportions under super-atmospheric pressure through a refrigerated processing chamber, said chamber when containing an agitator having a surface to volume ratio not substantially greater than 1:1 and not substantially less than 1:1½, scraping the congealed and crystallized portion of the mixture from the refrigerated surface of the processing chamber and intermingling it with the remainder of the mixture and agitating the entire mixture while under super-atmospheric pressure within said refrigerated processing chamber, said agitation continuing for a sufficient period of time to permit substantially complete crystallization of that portion of the mixture which may be crystallized at the temperature within the processing chamber, and whipping the mixture to avoid any substantial amount of delayed crystallization after the mixture leaves the ice cream processing chamber and is discharged into atmospheric pressure to produce a substantially form-retaining, completely processed ice cream within the processing chamber.

15. The process of continuously manufacturing ice cream having a predetermined overrun which consists in continuously and concurrently passing ice cream mix and gas in predetermined quantities under super-atmospheric pressure not substantially less than fifteen pounds per square inch gauge through a processing chamber in which the surface to volume ratio is not substantially greater than 1:1 and not substantially less than 1:1½, refrigerating the processing chamber for varying the temperature of the ice cream mix and gas within the chamber and congealing a portion of the ice cream mix by crystallization and cooling, scraping the congealed portion from the refrigerated surface and beating it together with the gas into the remainder of the ice cream mix during its passage through the processing chamber, and agitating the entire mixture of gas, ice cream mix and crystallized portion of the mixture under super-atmospheric pressure for a period of time varying from one to three minutes to produce an ice cream of near the maximum form-retaining stiffness at the temperature of the processed ice cream having uniformly dispersed ice crystals and vesiculated gas and in which delay crystallization at the temperature of the discharged ice cream when discharged into conditions of atmospheric pressure is substantially prevented.

16. The process of making ice cream, sherbet or the like consisting in continuously passing a liquid mix and gas into a closed processing chamber having a ratio of refrigerated surface measured in square inches to the volume of material in the processing chamber measured in cubic inches not substantially greater than 1:1 and not substantially less than 1:1½, maintaining said mix and gas in said chamber under a pressure not substantially less than fifteen pounds per square inch gauge, controlling the quantities and rate of admission of the mix and gas into the processing chamber and the rate of discharge of the desired finished product therefrom, refrigerating the outer wall of the processing chamber sufficiently to solidify a substantial portion of said mix at the temperature within the processing chamber to form a comparatively stiff mass of the mix and vesiculated gas upon discharge thereof from the processing chamber, rapidly removing the solidified material from said refrigerated wall, directing the solidified material into an agitating mechanism to blend it with the remaining mix and gas in the chamber under conditions substantially free from further direct refrigeration by contact with the refrigerated wall to envelop the gas under pressure in finely dispersed minute cells into the blended mass, re-exposing portions of the blended mass to further refrigeration action by further direct contact with the refrigerated wall to further solidify elements thereof, again removing the solidified portions of the mix from the refrigerated wall and redirecting the same into the agitator mechanism, repeating the sequential solidification agitation process for a period of one to three minutes to permit the substantial attainment of a state of equilibrium in the cooled and partially crystallized mass of blended mix and gas at the temperature of the processing chamber, further whipping the treated mass in a portion of the processing chamber substantially devoid of refrigeration, and discharging the completely processed mass at a uniform rate through a conduit devoid of refrigeration, whereby the gradual expansion of the gas cells within the processed mass is permitted without rupturing the cells in a substantially completely crystallized ice cream of maximum stiffness at the temperature of the processing chamber and having a predetermined overrun.

17. A machine for making ice cream, sherbet or the like from a liquid mix and gas, a processing chamber having a stationary wall, only part of which is subjected to the action of a refrigerant, means for refrigerating said part of the wall to a temperature below the crystallization temperature of a substantial portion of said liquid mix, means for continuously and concurrently delivering said liquid mix and gas into said chamber under a pressure not substantially less than fifteen pounds per square inch gauge, continuously moving the mix and gas into and through said processing chamber under a pressure not substantially less than fifteen pounds per square inch gauge, an adjustable means for regulating the relative proportions of liquid mix and gas admitted to said processing chamber to maintain thereby the desired quantity ratio between said mix and compressed gas within said chamber, said chamber having a ratio of refrigerated surface measured in square inches to the volume of mix and gas within said chamber measured in cubic inches not substantially greater than 1:1 and not substantially less than 1:1½, said means for delivering said mix and gas to said chamber having a capacity in proportion to the volumetric capacity of said chamber whereby the mix and gas being treated within said chamber remain in said chamber for a period of one to three minutes, a rotatable agitator and scraping means for removing solidified mix from the refrigerated portion of the processing chamber wall and for blending the solidified mix, gas and liquid portions of the mix within the chamber while remote from the refrigerated wall to prevent further substantial refrigeration, means for redirecting the blended mass to further refrigerating contact with the refrigerated wall of the processing chamber, and rotatable whipping means within a substantial unrefrigerated portion of said processing chamber for further whipping the treated mass while substantially devoid of any further refrigeration to permit the further completion of the crystallization process whereby to make a homogeneous ice cream or the like of substantially maximum form-retaining stiffness at the temperature of the processing chamber in which ice cream substantially all crystallization possible at that temperature has been completed before discharge of the ice cream to atmospheric pressure from the pressure freezing chamber.

18. A machine for processing ice cream including a cylindrical processing cylinder, a rotatable agitator mechanism within said cylinder forming therewith a substantially annular and sequentially interrupted flow passage, a scraping and whipping blade carried by said agitator mechanism and extending substantially to the processing cylinder wall throughout the entire length of the cylinder, means for effecting a continuous relative rotation of said agitator mechanism and said cylinder, means for introducing a mix and gas into said passage, means separate from said agitator mechanism for forcing said mix and gas continuously through said processing cylinder, means for changing the temperature of said mix and gas during the passage thereof through said processing cylinder to decrease the fluidity thereof, separate beating means within such agitator mechanism for agitating the mix and air separately from the agitation incidental to the passage thereof through the processing cylinder and the scraping thereof from the refrigerated walls of the processing cylinder, separate means for directing the mix and gas as it passes through said cylinder into the beating means housed within said agitator means, and means for separately whipping said material after the temperature thereof has been reduced to substantially the discharge temperature and after the material has passed said beater mechanism, whereby a homogeneous product of substantially completed crystallization at the temperature of the processing operation is produced.

19. An apparatus for refrigerating material, at least a portion of which is crystallizable, including a refrigerated chamber, means for refrigerating the surface of the chamber to a temperature below the crystallization temperature of a portion of the material, the ratio of the chilling surface of the chamber measured in square inches to the volume of the material in the chamber measured in cubic inches being within the limits of a variable surface to volume ratio varying between 1:1 and 1:1½, means outside the processing chamber of a sufficient capacity for forcing the material to flow through said refrigerated chamber during an interval of time varying from one to three minutes while a sufficient portion thereof becomes congealed to transfer the mass into a substantially maximum form-retaining stiffness at the discharge temperature of the material, and a bladed agitator mechanism in said chamber for scraping congealed material from said refrigerated chamber surface and having separate agitator means extending substantially throughout the entire length of said chamber for also agitating the material while passing through said processing chamber separately from the agitation incidental to the flow of the material through the chamber and the scraping of the material from the chamber wall.

20. An apparatus for refrigerating material, at least a portion of which is crystallizable, including a refrigerated chamber, means for refrigerating a portion of the surface of the chamber to a temperature below the crystallization temperature of the crystallizable portion of the material, the ratio of the refrigerated chilling surface of the chamber measured in square inches to the volume of the material in the refrigerated portion of the chamber measured in cubic inches being within the limits of a variable surface to volume ratio varying between 1:1 and 1:1½, means outside the processing chamber of a sufficient capacity for forcing the material to flow through said refrigerated chamber during an interval of time varying from one to three minutes while a sufficient portion of the material becomes congealed to transfer the entire material into a substantially maximum form-retaining stiffness at the temperature of the material, and a bladed agitator mechanism in said chamber for scraping congealed material from said refrigerated chamber surface and having separate beaters for separately beating the material while passing through said refrigerated portion of the chamber in addition to the agitation incidental to the flowing of the material through said refrigerated portion of the processing chamber and the scraping of the material from the refrigerated portion of the walls of the chamber, and agitating means in a portion of said chamber substantially devoid of effective refrigeration adapted to receive material from the refrigerated portion of the processing chamber for further agitating the material when substantially free of the effect of further refrigeration.

21. In an apparatus for manufacturing ice cream by the continuous method, the combination of a freezing cylinder having admission and discharge ports, means for continuously flowing metered quantities of partially crystallizable ice cream mix under super-atmospheric pressure to and through the freezing cylinder, means for continuously flowing quantities of gas to and through the freezing cylinder at a rate necessary to produce the desired proportion of gas and mix in the discharged product, means at the discharge port of said cylinder to adjustably control the pressure within the cylinder, means for refrigerating the freezing cylinder to cause a congealing of the ice cream mix upon the freezing cylinder by crystallizing a portion of the ice cream mix thereon, and scraping means within the cylinder for scraping the congealed portion of the ice cream mix from the freezing cylinder, said freezing cylinder having a freezing surface in proportion to its volumetric content of ice cream mix and gas varying in ratio between 1:1 and 1:1½, said means for flowing ice cream mix and said means for flowing gas through said freezing cylinder being of capacities sufficient to cause the ice cream mix and gas to flow under super-atmospheric pressure not substantially less than fifteen pounds per square inch gauge from the admission port to the discharge port in a period of time varying from one to three minutes when producing a product of desired stiffness when discharged from the freezing cylinder.

22. The method of continuously producing ice cream according to claim 4 in which said processing chamber has an internal surface to volume ratio not substantially greater than 1:1 and not substantially less than 1:1½.

23. The method of continuously producing ice cream according to claim 4 in which said processing chamber has an internal surface to volume ratio not substantially greater than 1:1 and not substantially less than 1:1½ and which processing chamber comprises a cylinder, the internal diameter of which is not less than four inches and not greater than six and one-half inches.

24. In an apparatus for manufacturing ice cream by the continuous method, the combination of a freezing cylinder having admission and discharge ports, means for continuously flowing metered quantities of partially crystallizable ice cream mix under super-atmospheric pressure to and through the freezing cylinder, means for continuously flowing quantities of gas to and through the freezing cylinder at a rate necessary to produce the desired proportion of gas and mix in the discharged product, means at the discharge port of said cylinder to adjustably control the pressure within the cylinder, means for refrigerating the freezing cylinder to cause a congealing of the ice cream mix upon the freezing cylinder by crystallizing a portion of the ice cream mix thereon, and scraping means within the cylinder for scraping the congealed portion of the ice cream mix from the freezing cylinder, said freezing cylinder having a freezing surface in proportion to its volumetric content of ice cream mix and gas varying in ratio between 1:1 and 1:1½, said means for flowing ice cream mix and said means for flowing gas through said freezing cylinder being of capacities sufficient to cause the ice cream mix and gas to flow under super-atmospheric pressure not substantially less than fifteen pounds per square inch gauge from the admission port to the discharge port when producing a product of desired stiffness when discharged from the freezing cylinder.

25. The process of continuously manufacturing ice cream according to claim 10 in which the internal diameter of said processing chamber is not less than four inches and not greater than six and one-half inches and which chamber when containing an agitator has a ratio of surface to unoccupied volume not substantially greater than 1:1 and not substantially less than 1:1½.

26. An apparatus for manufacturing ice cream according to claim 21 wherein the internal diameter of said freezing cylinder is not less than four inches and not greater than six and one-half inches.

27. An apparatus for manufacturing ice cream according to claim 2 in which the internal diameter of said freezing cylinder is not less than four inches and not greater than six and one-half inches.

28. The process of manufacturing ice cream according to claim 12 in which said processing chamber comprises a cylinder, the minimum internal diameter of which is not less than four inches and the maximum internal diameter of which is not greater than six and one-half inches.

29. An apparatus for manufacturing ice cream according to claim 21 in which the internal diameter of said freezing cylinder is not less than four inches and not greater than six and one-half inches and in which the freezing cylinder has an internal refrigerated surface measured in square inches in proportion to its internal volumetric capacity measured in cubic inches when devoid of scraping and whipping mechanisms varying in ratio between 1:1 and 1:1½.

30. The process of manufacturing ice cream according to claim 12 in which said processing chamber has an internal diameter of not less than four inches and not greater than six and one-half inches and a refrigerated surface measured in square inches in proportion to volumetric capacity measured in cubic inches when devoid of scraping and whipping mechanisms varying in ratio between 1:1 and 1:1½.

31. The process of manufacturing semi-solid, edible foodstuffs having incorporated therein a predetermined quantity of vesiculated gas consisting in causing a continuous flow of a mixture of predetermined quantities of the constituents of said edible foodstuffs and the necessary quantities of gas to be incorporated therein under super-atmospheric pressure through a temperature lowering processing chamber, subjecting the surface of said temperature lowering processing chamber to the action of a refrigerant to chill the mixture passing therethrough, causing a portion of said mixture to rapidly congeal and crystallize on the surface of said processing chamber, rapidly scraping off the congealed and crystallized portion and blending it with the remainder of the mixture, agitating the entire mixture while subjecting it to continued refrigeration for a period sufficient to permit the substantial completion of the crystallization of a substantial portion of the crystallizable mixture, whipping the agitated and refrigerated mixture without further substantial refrigeration under the same conditions of pressure existing in the cooled processing chamber, and gradually reducing the pressure upon the processed mixture during the discharge thereof from said processing chamber.

32. The process of manufacturing semi-solid, edible foodstuffs according to claim 31 in which said processing chamber when devoid of scraping and blending means has a ratio of refrigerated surface measured in square inches to volume measured in cubic inches not substantially greater than 1:1 and not substantially less than 1:1½ and which processing chamber has an internal diameter of not less than four inches and not greater than six and one-half inches.

33. The process of manufacturing ice cream according to claim 14 in which said refrigerated processing chamber when containing an agitator has a surface to volume ratio not greater than 1:1 and not less than 1:1½.

34. The process of manufacturing semi-solid, edible foodstuffs according to claim 31 in which said processing chamber when devoid of scraping and blending means has a ratio of refrigerated surface measured in square inches to volume measured in cubic inches not substantially greater than 1:1 and not substantially less than 1:1½, which processing chamber has an internal diameter of not less than four inches and not greater than six and one-half inches and which processing chamber contains scraping, blending and agitating mechanisms in which agitation and blending of the product being processed is produced by positively and relatively rotating some of the elements of said scraping, blending and agitating mechanisms with respect to other elements of said mechanisms.

35. An apparatus for manufacturing ice cream according to claim 24 in which said freezing cylinder has an internal diameter of not less than four inches and not greater than six and one-half inches.

CHARLES F. WEINREICH.
ALBERT L. VOGGENTHALER.